United States Patent [19]

Messaros et al.

[11] Patent Number: 5,594,663
[45] Date of Patent: Jan. 14, 1997

[54] REMOTE DIAGNOSTIC TOOL

[75] Inventors: David W. Messaros, Wallingford; Robert E. Cook; Ronald A. Medykiewicz, both of West Chester, all of Pa.

[73] Assignee: Hewlett-Packard Company, Palo Alto, Calif.

[21] Appl. No.: 376,505

[22] Filed: Jan. 23, 1995

[51] Int. Cl.⁶ .................................................. G05B 19/04
[52] U.S. Cl. ....................... 364/550; 364/138; 395/183.22
[58] Field of Search ............................. 364/138, 474.11, 364/474.19, 550, 551.01, 551.02; 395/183.22

[56] References Cited

U.S. PATENT DOCUMENTS

| Re. 31,247 | 5/1983 | Johnstone | 364/474.19 |
|---|---|---|---|
| 3,882,305 | 5/1975 | Johnstone | 364/551.02 |
| 4,109,309 | 8/1978 | Johnstone et al. | 364/474.11 |
| 4,162,531 | 7/1979 | Rode et al. | 364/571.04 |
| 4,216,462 | 8/1980 | McGrath et al. | 340/870.11 X |
| 4,390,953 | 6/1983 | Johnstone | 364/474.19 |
| 4,425,625 | 1/1984 | Seligman et al. | 379/98 |
| 4,507,740 | 3/1985 | Star et al. | 364/487 |
| 4,812,996 | 3/1989 | Stubs | 364/487 |
| 4,967,381 | 10/1990 | Lane et al. | 364/551.01 |
| 4,974,181 | 11/1990 | Sinderson et al. | 364/550 |
| 5,353,238 | 10/1994 | Neef et al. | 364/551.01 |
| 5,388,252 | 2/1995 | Dreste et al. | 395/183.22 |

Primary Examiner—Edward R. Cosimano
Attorney, Agent, or Firm—Richard F. Schuette

[57] ABSTRACT

A diagnostics tool having a graphical user interface coupled to an instrument from a remote location for inspecting instrument variables, parameters and set-points, performance testing, as well as, managing information resources necessary to repair the instrument to provide fast and accurate diagnosis of problems and faults within the instrument.

14 Claims, 8 Drawing Sheets

REMOTE DIAGNOSTIC TOOL

FIELD OF THE INVENTION

The present invention relates to methods and apparatus for remote diagnosis of an instrument and, more particularly, to a remote diagnostic device for communicating with an instrument to determine instrument configuration, components, variables and setpoints for remote service and support.

BACKGROUND OF THE INVENTION

Product service and support typically involves sending a customer engineer to a customer site to service a product. Once on-site, the customer engineer will attempt to ascertain or diagnoses the problem that led to the visit and implement a repair. Remote service and support may be accomplished over the telephone through a series of questions and answers between the customer and the customer engineer. Unfortunately, the problem described by the customer is not always the actual problem and results in an unhappy customer and a frustrated customer engineer.

There exists a need for a remote diagnostic tool that reduces the cost of providing service and support to customers. Since a portion of all service calls do not require the replacement of hardware, it would be desirable to provide for service calls without an on-site visit by a customer engineer. For example, there would be savings of both time and money if service requests could be handled from a centralized location by a remote diagnostic tool over standard telephone lines.

It would be desirable and of considerable advantage to provide a diagnostic tool that provides for continuous remote monitoring of selected instrument operations. Furthermore, it would be advantageous if such a remote diagnostic tool could also provide automated access to reference material required to diagnose and repair service related problems. There is a need for connecting an instrument to a diagnostic tool either remotely or locally to provide for real-time instrument diagnostics.

It would be advantageous to be able to determine the effect of instrument configuration on a problem and to provide for remote monitoring of an instrument's self diagnostic and self inspection firmware and hardware, and present this information in an easily understandable form to provide faster and more accurate diagnosis of the problem. It would also be advantageous to provide for interpretation of information or observations gathered about an instrument which is malfunctioning, using that information to determine the cause of the malfunction and then correct the cause.

It will be apparent from the foregoing that there is a need for a diagnostic tool that can be coupled to an instrument from a remote location and that provides for inspection of instrument variables, parameters and setpoints, the viewing of histories and performance testing, as well as manages an information resource necessary to repair the instrument.

SUMMARY OF THE INVENTION

The invention is a diagnostic tool coupled to an instrument from a remote location for inspecting instrument variables, parameters and setpoints, performance testing, as well as managing information resources necessary to repair the instrument to provide fast and accurate diagnosis of problems and faults within the instrument.

Access to the instrument is provided through a computer executing instrument control software to perform diagnosis and repair of the instrument. The instrument comprises a multiplexed A/D converter configured with sensing circuitry to measure a plurality of operating parameters within the instrument, sensing circuitry for ascertaining hardware configurations and instrument variables, and a command set having a plurality of diagnostic commands for requesting the A/D converter to measure instrument operating parameters and the hardware configurations. A computer is coupled to the instrument and executes diagnostic software to generate the diagnostic commands which are communicated to the instrument to request operating parameters for display on the computer and for diagnosis and repair of the instrument. The command set of the instrument further comprises a plurality of commands which enable the computer to control the instrument to enhance the ability to diagnose and repair problems.

The computer may be coupled to the instrument over standard telephone lines from a remote location or directly from an on-site location. Diagnostic software executing on the computer employs a graphical user interface to enhance remote diagnosis and repair by executing diagnostic tests, providing access to an on-line service manual, providing a linkage to the instrument control software, as well as providing a linkage to a support organization's information systems. The ability to know the most probable cause of a defective instrument component prior to travelling to a customer's site flows from the use of this method.

Other aspects and advantages of the present invention will become apparent from the following detailed description, taken in conjunction with the accompanying drawings, illustrating by way of example the principles of the invention.

DETAILED DESCRIPTION OF THE PREFERRED EMBODIMENTS

The invention is a diagnostic tool that employs a graphical user interface for remote monitoring and manipulation of an instrument and selected instrument variables to enhance instrument diagnosis and repair.

Figure 1:
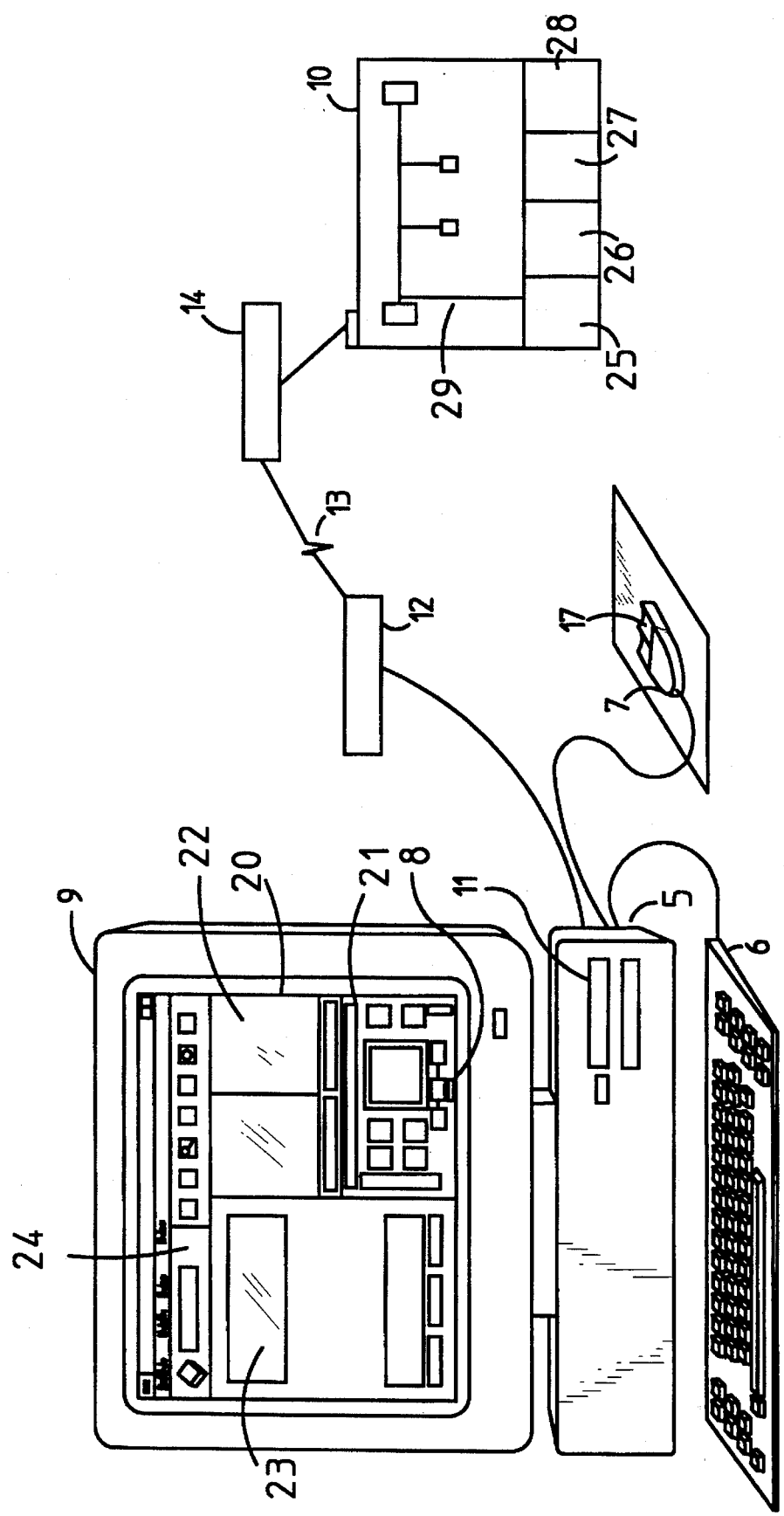
FIG. 1 is a schematic representation of a computer coupled to a remote instrument, the computer displaying the preferred embodiment of the remote diagnostic tool.

In accordance with a first aspect of the present invention, FIG. 1 depicts a computer 5 including a keyboard 6 and an input device 7 for moving a cursor 8 around the screen display 9. The computer 5 has a Windows based operating system and upon execution of a software diagnostic tool 11 written in the Visual Basic programming language (those skilled in the art will be aware of other operating systems and programming languages which may otherwise be employed), a graphical user interface 20 is generated on the screen display 9. The graphical user interface 20 includes an instrument schematic window 21 which resembles the instrument 10, an instrument variables window 22 for identifying instrument variables and their associated values, a memo pad window 23 for identifying selected instrument variables for continuous display and a status bar window 24 for displaying icons (for example, method, keyboard and display) which may be accessed to assist in diagnosis and repair of the instrument 10. An enter button 17 on the input device 7 is employed for accessing information or data highlighted on any of the windows by the cursor 8. A modem 12, a modem 14 and available RS-232 ports couple the computer 5 to the instrument 10 over a standard telephone line 13. The instrument 10 includes a processor 25, memory 26, firmware 27, a multiplexed A/D converter 28 and sensing circuitry 29.

The instrument 10 has a command set which in addition to commands related to controlling instrument operation, includes a plurality of diagnostic commands for requesting the output of the A/D converter 28 and the sensing circuitry 29. Sensors 29 within the instrument 10 provide instrument configuration signals that are employed by the diagnostic tool for automatically displaying the configuration parameters. The sensors 29 are designed to access diagnostic information within the instrument 10 and to access supporting operations.

The configuration parameters may be either hardware configuration items or user configuration items, a subset of both include the temperature at seven different heated zones, the heater configuration, fault protection, valve box configuration, inlet type, detector type, type of cryogenic cooling fluid, gas pressures and flow rates, gas type, column parameters, oven maximum temperature and valve parameters. While the computer employed in the preferred embodiment is commonly referred to as a PC, other forms of computers such as a workstation running a UNIX operating system or the like may be employed.

Figure 2:
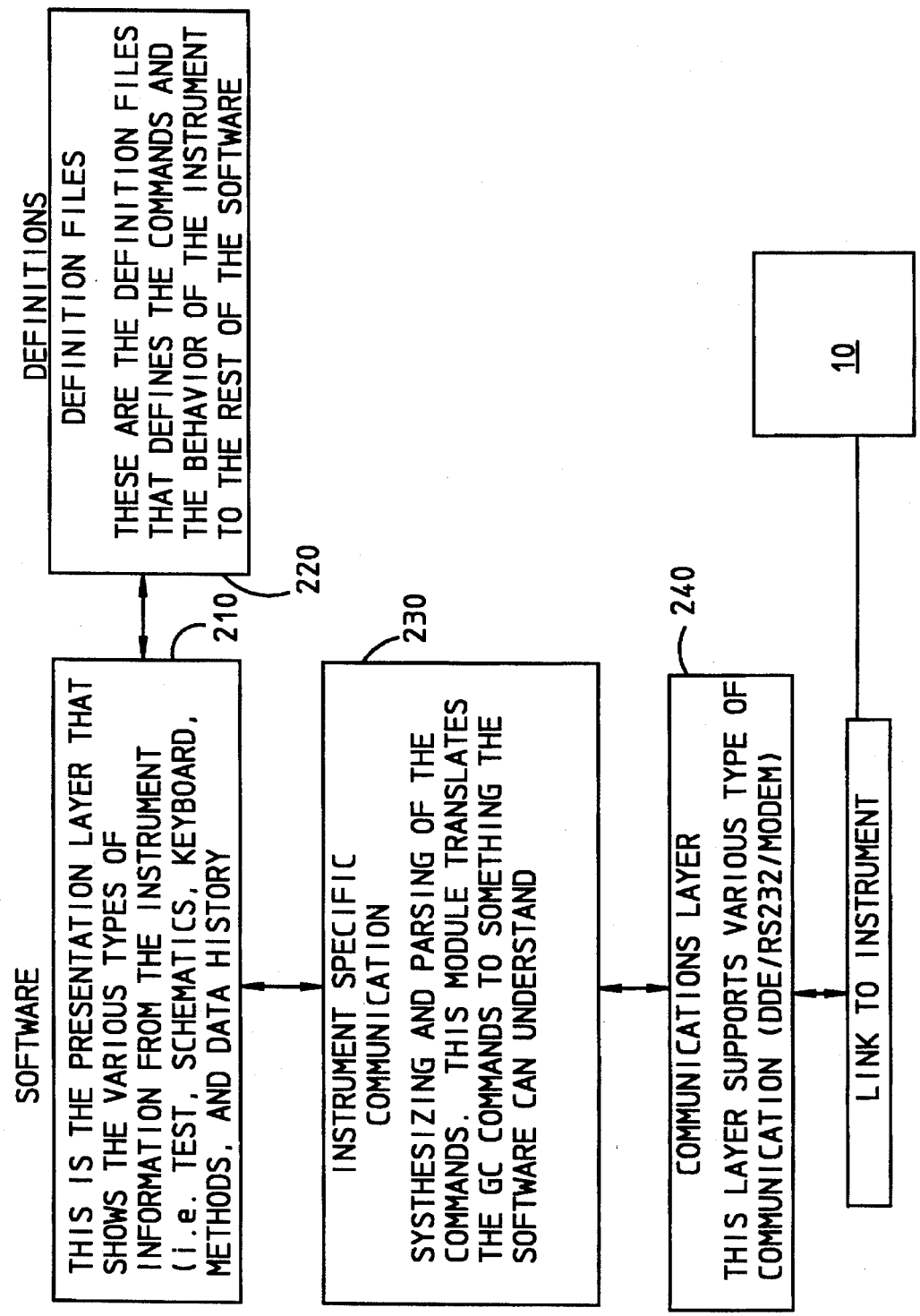
FIG. 2 depicts another simplified schematic of the embodiment of FIG. 1 highlighting the software components in the remote computer and in the instrument.

As illustrated in FIG. 2, the software application 11 which executes on the computer 5 comprises a high level presentation layer 210 which is responsible for displaying the graphical user interface 20 (FIG. 1) such that the user can navigate through the instrument schematic window 21, instrument variable window 22, memo pad window 23 and the status bar window 24, to identify instrument information for accessing. Upon identification of a selected piece of information, the software application communicates with the computer 5 and accesses Definition Files 220 to define the commands required to obtain the desired information from the instrument. An Instrument Specific Communication layer 230 of the software application then synthesizes and parses these commands into commands which the instrument can understand. For example, if the user wants to determine the temperature of the FID zone, the cursor 8 is moved over to the FID displayed on the instrument schematic 21 and the enter button 17 on the input device 7 is depressed, in response, the software application will access the Definition Files 220 for a definition of FID zone temperature and will obtain, the corresponding instrument variable "fid.detector.zoneTemp, zone temp,zone temp,2,1", and its associated Instrument command definition "fid.detector.zoneTemp, 0,D#TI, 1, ,1,1,,,,,,5". This definition will indicate the types of information which will be displayed upon the graphical user interface. The synthesizing and parsing layer of the software application, in combination with a command processor will take the Instrument command definition of the FID and translates it into a set of commands which the instrument will understand, The communications layer 240 of the software application then controls the modem 12 to communicate this command over the telephone line 13, modem 14 to the instrument 10 (FIG. 1).

The instrument 10 includes sensing circuitry which generates instrument output values. These values are communicated back to the computer in response to the received command such that the user operating the computer 5 may perform diagnosis and repair of the instrument. The command set of the instrument further comprises a plurality of commands which when communicated from the computer 5, enable the user to control the operation of the instrument. Thus, the user can not only obtain diagnostic information during instrument operation, the user can control the instrument to document actual performance in response to a specific request.

Figure 3:
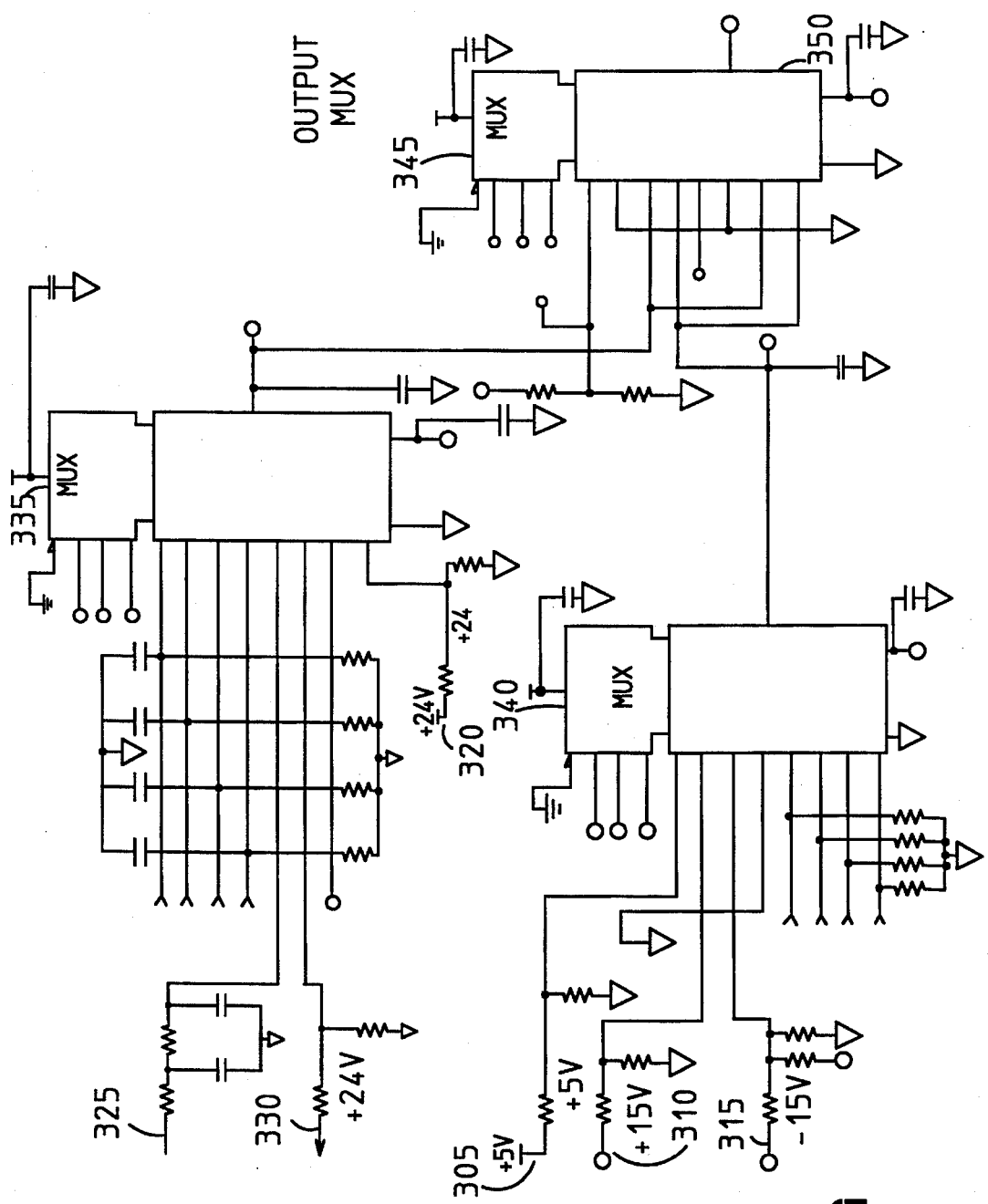
FIG. 3 depicts a schematic diagram of a sensing circuit comprising a plurality of multiplexers for sensing power supply voltages.

In particular, FIG. 3 is a schematic diagram of a sensing circuit for sensing power supply output voltages 305, 310, 315, 320 (+5 v, +15 v, −15 V, +24 v), zone voltage 325 and the pneumatics voltage 330. Each of the sensed voltages is coupled to either the multiplexer 335 or the multiplexer 340, the outputs of which are coupled to the output multiplexer 345. The output of the output multiplexer 345 is coupled to an A/D converter 350 for generating a multiplexed digital output signal corresponding to the sensed voltages. The multiplexed digital output signal is available upon request by the instrument processor in response to commands communicated from the remote computer.

Figure 4:
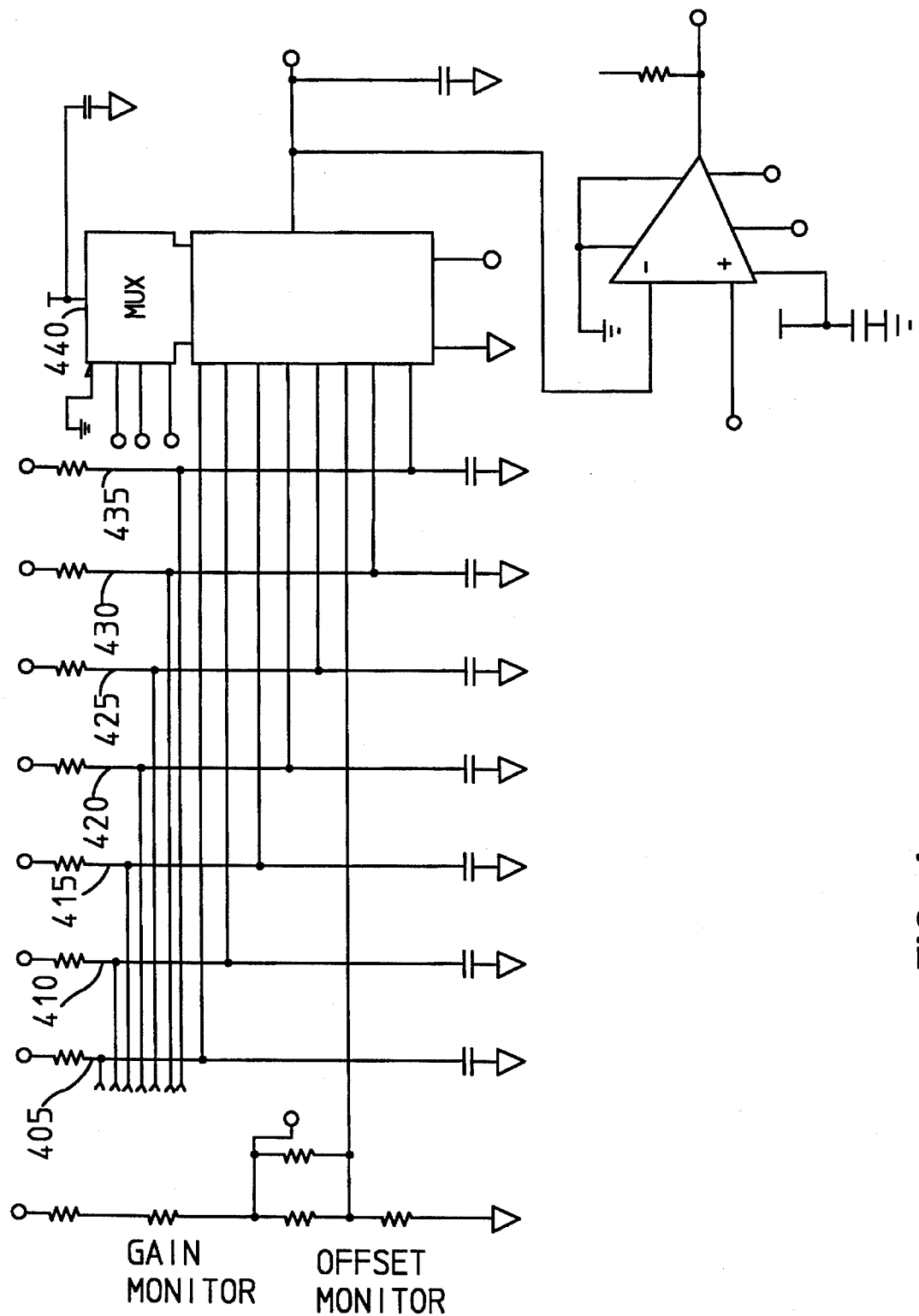
FIG. 4 depicts a schematic diagram of a sensing circuit comprising a multiplexer for sensing at seven heated zone temperatures.

FIG. 4 is a schematic diagram of a sensing circuit for sensing the heated zone temperatures at seven instrument locations. In particular, the following leads, the Aux2 405, the Detector B 410, the Detector A 415, the Aux 1 at 420, the Oven 425, the Injection port A 430 and the Injection port B 435 couple a plurality of thermistors at each of the corresponding locations to the multiplexer 440. The output of the multiplexer 440 is coupled to an A/D converter for generating a multiplexed digital output signal which is available upon request by the processor.

Figure 5:
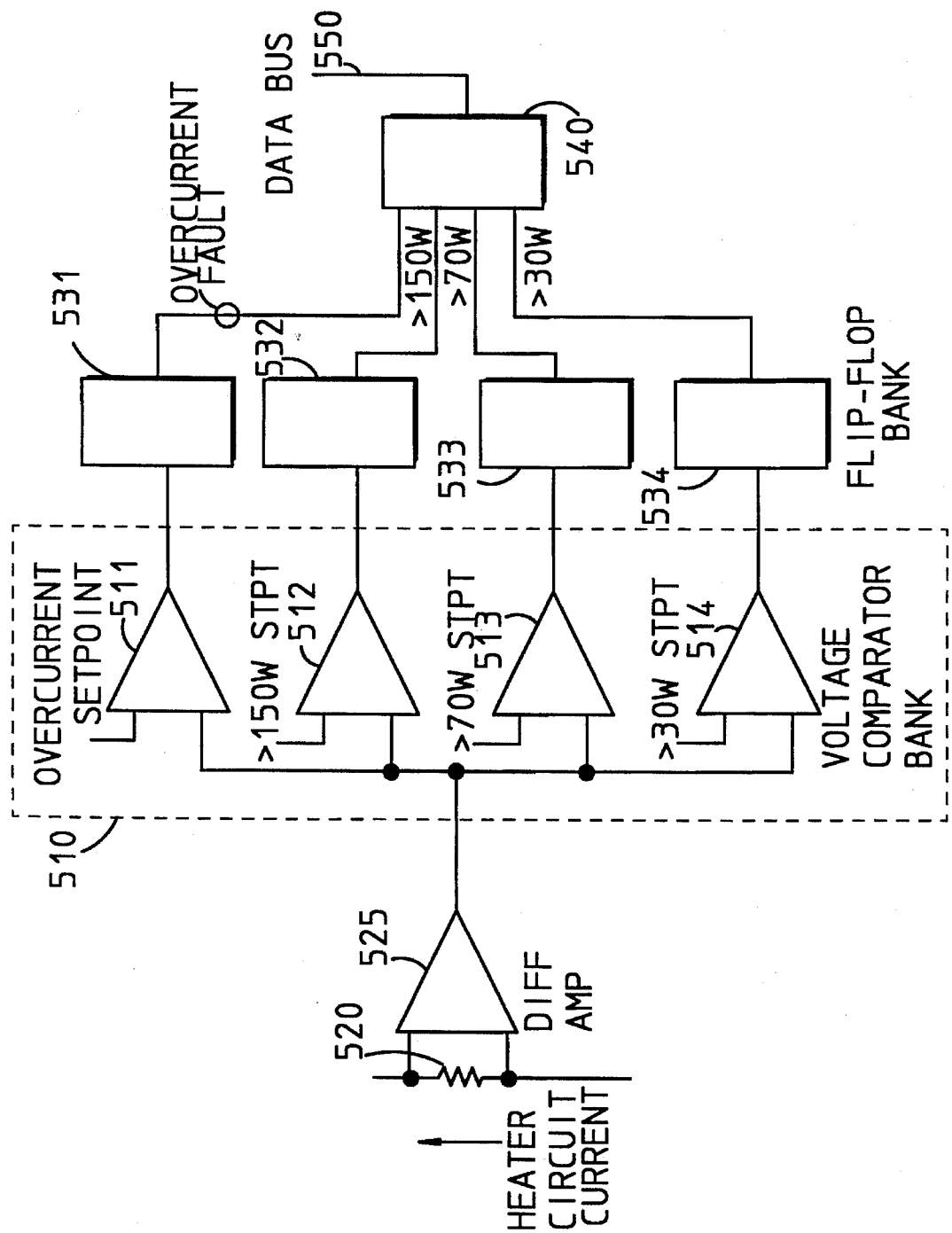
FIG. 5 depicts a block diagram of the heater configuration sensing and fault protection circuitry.

A block diagram of the heater configuration sensing and fault protection circuitry is depicted in FIG. 5. This circuit senses the wattage range of the heater installed in each heated zone in the instrument. As suggested by the voltage comparator bank 510, the wattage ranges are greater than 30 watts, greater than 70 watts and greater than 150 watts. The total heater wattage is determined by the firmware 207 executing on the instruments processor 205 (FIG. 2) which checks if the heater wattage exceeds a predefined maximum limit. The circuit illustrated in FIG. 5 may also be employed for sensing an overcurrent fault, such as that created when a heater short-circuits, upon which all power is removed from the heated zones. The overcurrent fault protection circuit consists of a current sense resistor 520, a differential amplifier 525, voltage comparators 511, 512, 513, 514, flip-flops 531, 532, 533, 534 and an octal bus driver 540. The existence of an overcurrent fault is communicated over the data bus 550 to the instrument processor 205 (FIG. 2).

At instrument power-up, a voltage proportional to the zone heater's power is developed across the sense resistor 520. This voltage is amplified by the differential amplifier 525 and applied to the bank of voltage comparators 510, which set one or more flip-flops (511–514). Each flip-flop corresponds to a wattage range into which the measured heater can fall. The output of the octal bus driver 540 is communicated via the data bus 550 to the processor 205. Firmware 207 (FIG. 2) then determines which flip-flops were set, records the wattage range, turns off the sensed heater, and clears the flip-flops. Each heated zone within the instrument is sensed in this manner.

Figure 6:
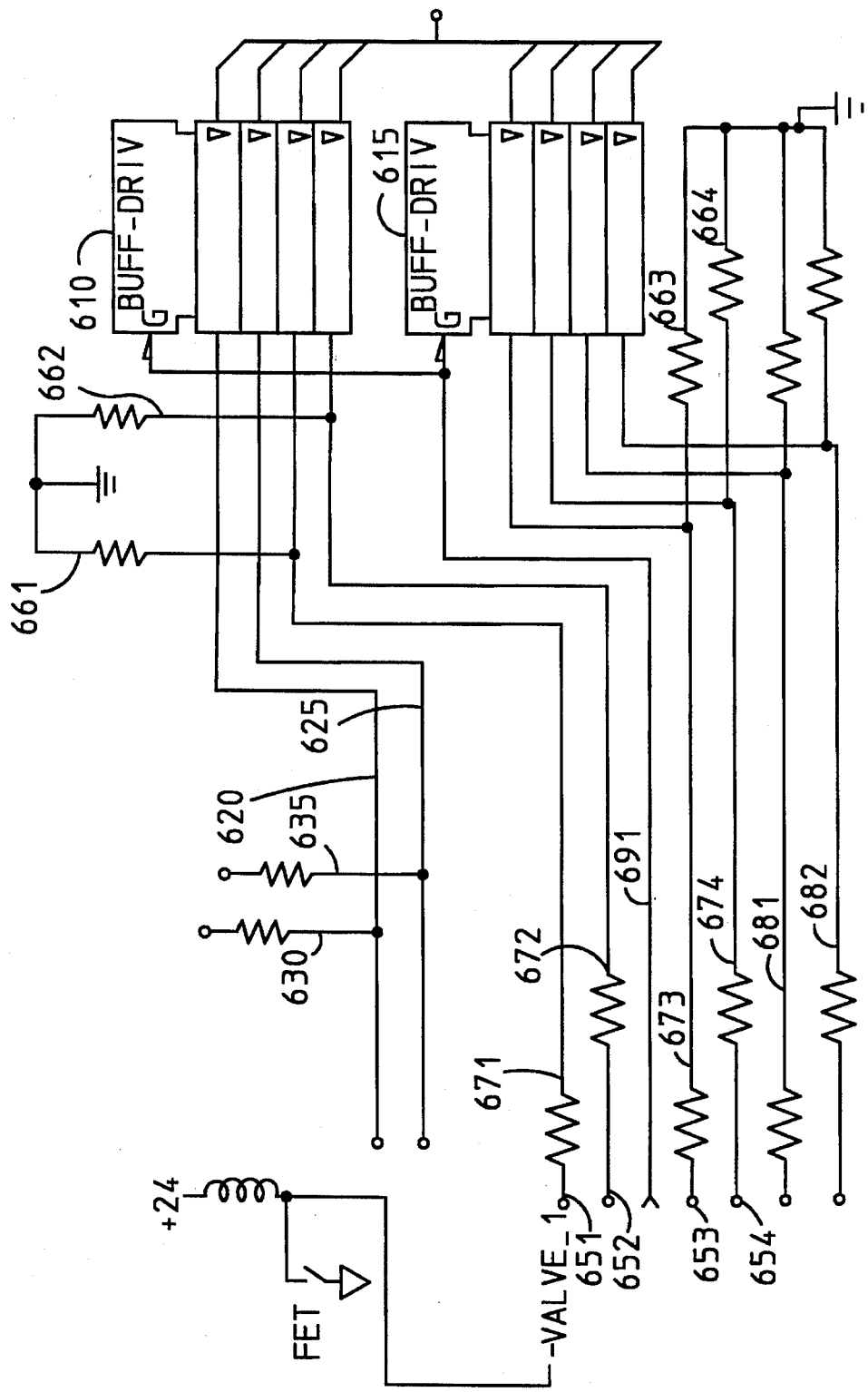
FIG. 6 is a schematic diagram of sensing circuitry within the instrument for generating signals corresponding to the valving configuration of the instrument.

FIG. 6 is a schematic diagram of sensing circuitry within the instrument for generating signals corresponding to the valving configuration of the instrument. For example, circuitry determines whether the instrument oven includes a valve for controlling cryogenic cooling and, if such a valve is installed, whether the cryogenic fluid employed is liquid Nitrogen or Carbon Dioxide. In particular, the configuration sensing circuitry consists of a pair of octal bus drivers 610 and 615 that read individual signal lines to determine whether they are high (active) or low. The lead 620 and lead 625 are attached to a connector which may be coupled with one of two plugs (not shown) associated with either the nitrogen or carbon dioxide supply. The leads are normally pulled high by the 10K ohm pullup resistors 630 and 635. The connector has a unique wire jumper that pulls either the liquid nitrogen line or carbon dioxide line to ground when the associated plug is inserted. If no cryogenic valve is installed in the oven, then both lines will remain high.

The configuration sensing circuit also generates a valve box signal for indicating the presence of up to four different valve box valves. Each valve box valve (not shown) is coupled to one of four valve box sensing leads 651, 652, 653 and 654. If a valve box valve is installed on the instrument, the corresponding lead will be pulled high indicating that a valve box valve is installed. If no valve is installed, the bus driver 610 or 615 inputs will be coupled to near ground potential through a 1 k ohm pulldown resistor 661, 662, 663 or 664. When a valve is connected and turned off, a small amount of current flows through the valve, through the 6.8 k ohm resistor 671, 672, 673 or 674, through the 1 k ohm pulldown 661, 662, 663 or 664 and then to ground. With a valve installed, the resultant voltage at the input of bus driver 610 and 615 is at least 2.5 Vdc and indicates the presence of the valve. In the same fashion, lead 681 and 682 are employed for generating a signal indicating the presence of one ore more split/splitless valves, and lead 691 is employed for generating a signal indicating the presence of an inlet fan.

Figure 7:
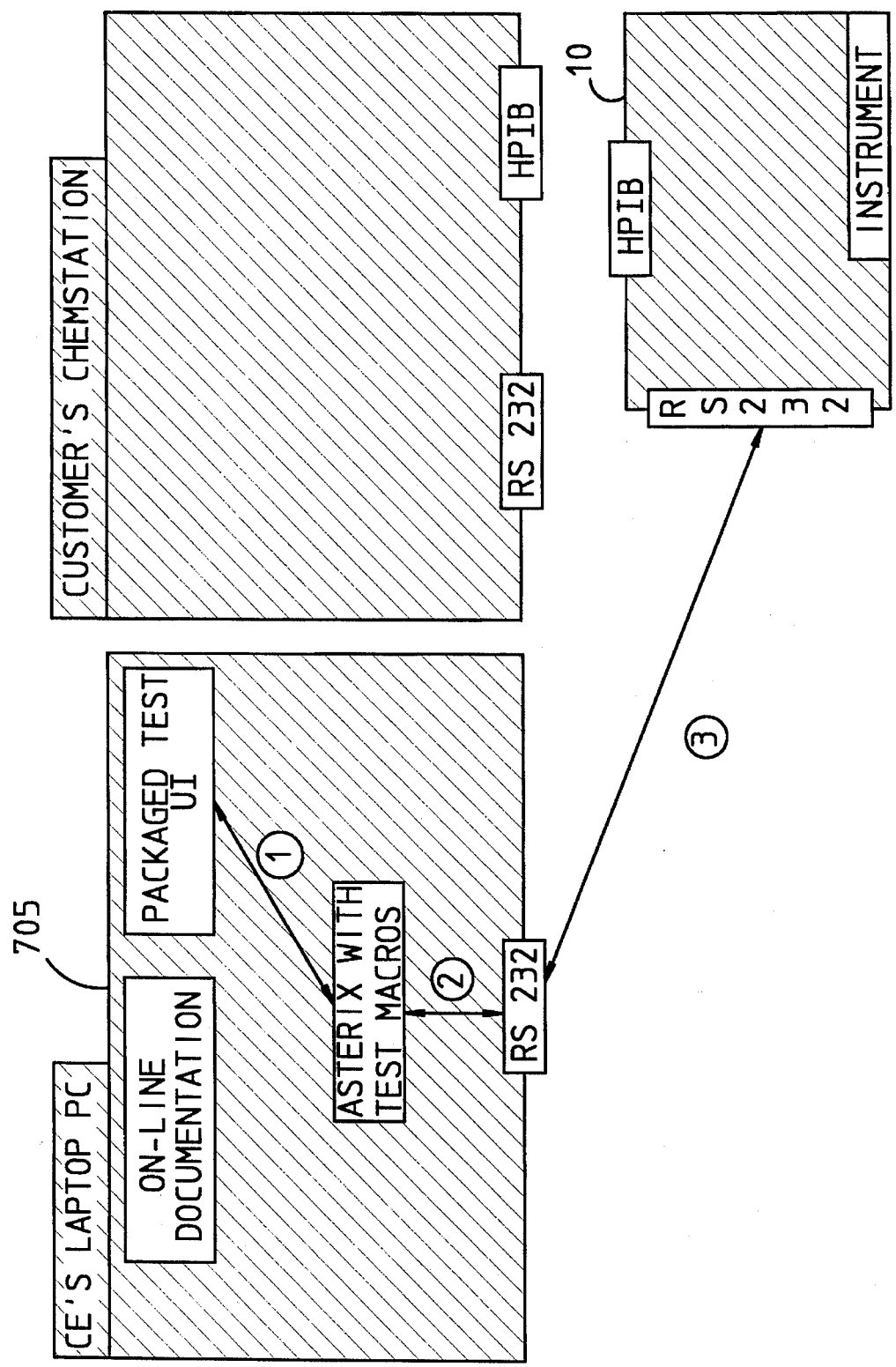
FIG. 7 illustrates an alternative embodiment of the invention in which a laptop computer is coupled directly to the instrument.

FIG. 7 illustrates an alternative embodiment in which a laptop computer 705 is coupled directly to an instrument 10 through an RS232 null-modem (umbilical) cable. In this manner modems and associated telephone lines are not required as the customer engineer is at the customer site and is utilizing the laptop computer to run diagnostic software.

Figure 8:
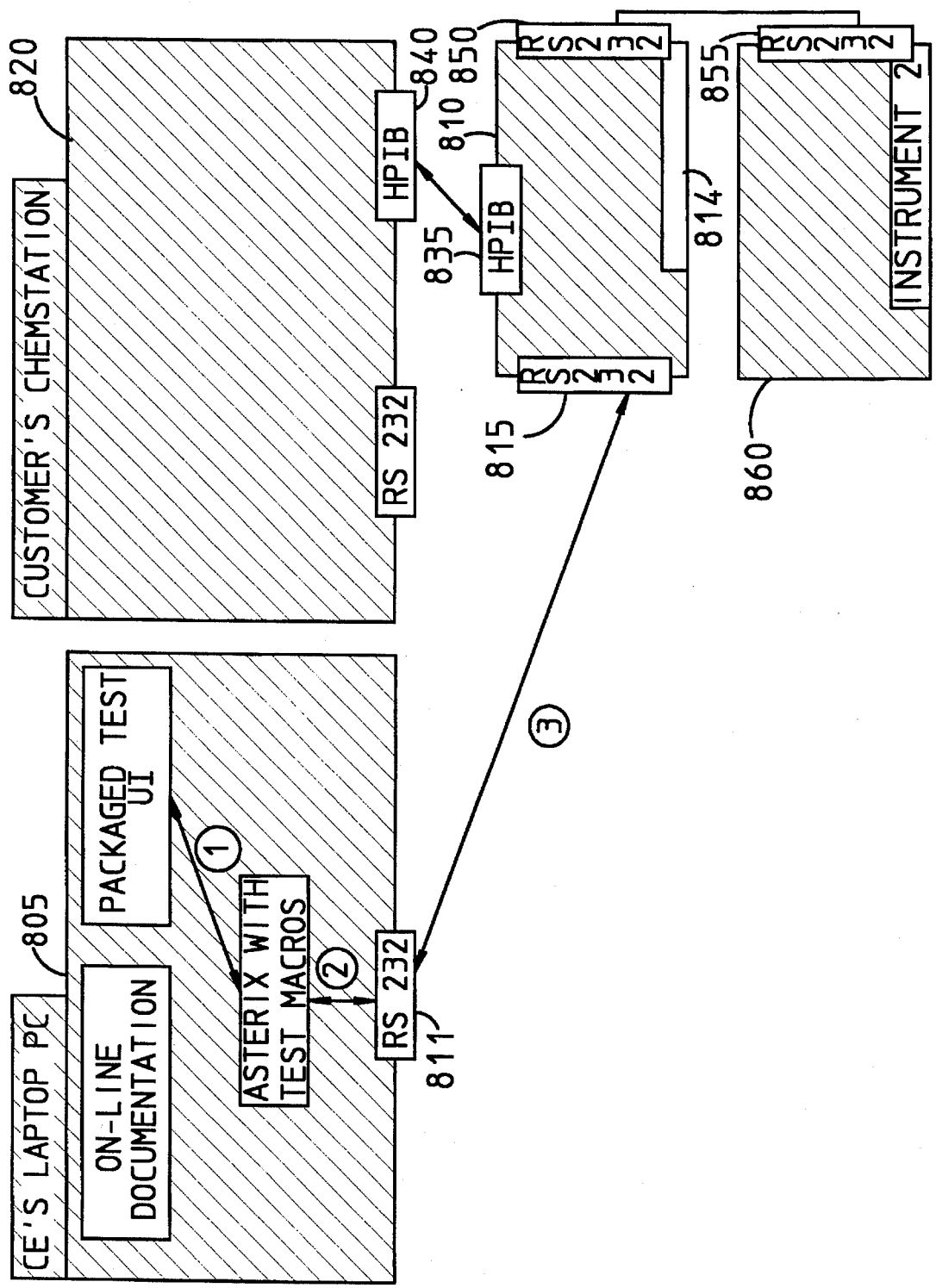
FIG. 8 illustrates an alternative embodiment in which two computers may be coupled to the instrument simultaneously

FIG. 8 illustrates another alternative embodiment in which a first computer 805 is coupled to the instrument 810 through RS232 ports 811 and 815, and simultaneously, a second computer 820 is coupled to the instrument 810 through HPIB ports 835 and 840. The instrument 810 is capable of communicating with both computers simultaneously. For example, computer 820 may be in the process of executing software for analyzing the output of instrument 810, while at the same time, computer 805 is executing diagnostic software to diagnose a problem with instrument 810. The computer 805 can send commands to the instrument 810 requesting information regarding instrument operation, and in response, the instrument 810 will communicate the current status of the instrument such that the computer 805 can view the instrument during operation.

The instrument 810 also includes a second RS232 port 850 which may be employed for coupling to a second instrument 860 having an RS232 port 855. The second instrument may be an injection device or a sample preparation device etc. Pass-through commands may be generated by the computer 805 and communicated to the instrument 810. The processor 814 within instrument 810 reads the address on the pass-through command and forwards it to the instrument 860. The instrument 860 will then carry out the command as if it were directly communicated from the computer 805.

While the invention has been described and illustrated with reference to specific embodiments in the area of gas chromatography, those skilled in the art will recognize that modification and variations may be made such that the invention is equally applicable to the remote sensing of any type of instrument that has the ability to generate signals which can be communicated to a computer capable of executing the inventive diagnostic tool.

What is claimed is:

1. A method for performing remote diagnostics of an instrument by a computer executing a diagnostic software tool, comprising the method steps of:

executing a software application on the computer to generate a graphical user interface depicting the instrument, accessing the depiction of the instrument to identify a component of the instrument for diagnosis, generating commands which can be understood by the instrument to request diagnostic information, communicating the generated commands to the instrument, sensing the requesting information on the instrument and communicating the sensed information to the computer for display and diagnosis.

2. The method as claimed in claim 1, said step of measuring operating parameters further comprises a multiplexed A/D converter to perform sensing on multiple parameters.

3. The method, as claimed in claim 1, further comprising the step of sensing the configuration of the instrument and communicating the sensed configuration to the computer for display on the graphical user interface.

4. The method as claimed in claim 3, wherein sensing the configuration of the instrument further comprises determining the configuration of the heated zone and the approximate wattage of a heater installed in a particular heated zone.

5. The method as claimed in claim 3, the step of sensing the configuration of the instrument further comprises sensing the type of cryogenic fluid coupled to the instrument, wherein, the cryo connector has a unique pin configuration.

6. The method as claimed in claim 3, the step of sensing the configuration of the instrument further comprises sensing valve configuration.

7. The method as claimed in claim 3, wherein, the computer is coupled to the instrument over standard telephone lines using a first and a second modem.

8. The method as claimed in claim 3, wherein the computer is coupled directly to the instrument by a cable and RS232 ports on both the computer and the instrument.

9. The method as claimed in claim 3, further comprising the step of coupling a second instrument to the first instrument, wherein the computer sends pass through commands to the first instrument which passes them through to the second instrument.

10. An apparatus for diagnosis and repair of an instrument, comprising:
   an instrument, comprising:
      a communications port for receiving commands and for transmitting data,
      a sensing circuitry for measuring a plurality of instrument variables and operating parameters within the instrument,
      a processor having a command set comprising a plurality of diagnostic commands for requesting the sensing circuitry to measure operating parameters,
   a computer, remote from the instrument, comprising
      a processor and a communication port for communicating with the instrument,
      memory for storing definitions of instrument variables and operating parameters,
      a display which displays a graphical user interface depicting the instrument and instrument variables,
      a software application program which executes on the computer to generate the graphical user interface, to translate the instrument definitions into diagnostic commands and to set up a communications link over the communications port in both the computer and the instrument, wherein, instrument operating parameters may be requested from a remote location and communicated to the computer for diagnosis and repair.

11. The apparatus for diagnosis and repair of an instrument as claimed in claim 10, said processor command set further comprising a plurality of commands that enable the computer to control the instrument.

12. The apparatus for diagnosis and repair of an instrument as claimed in claim 10, the sensing circuitry further comprises a multiplexed A/D converter.

13. The apparatus for diagnosis and repair of an instrument as claimed in claim 10, wherein the instrument further comprises a second communications port such that a second computer can be coupled to, and communicate simultaneously with, the instrument.

14. The apparatus as claimed in claim 13, wherein the second communications port is an HPIB port.

* * * * *